May 20, 1952  A. H. NAEF ET AL  2,597,123
TOTALIZER AND CALCULATOR

Filed July 12, 1946  3 Sheets-Sheet 1

Inventor
ALFRED H. NAEF, AND
JOHN P. SMITH, JR

By Robe Meyer
Attorney

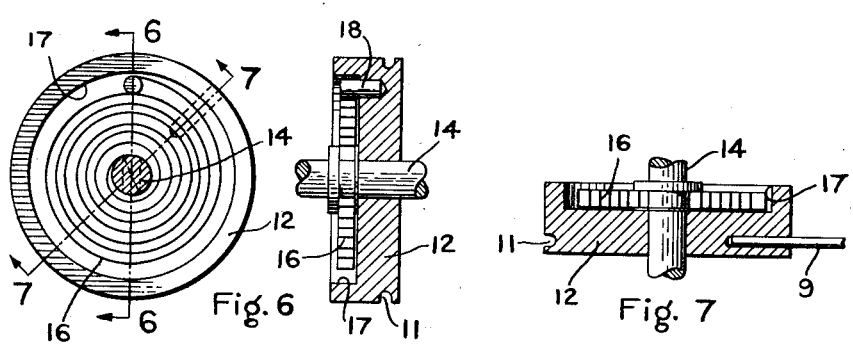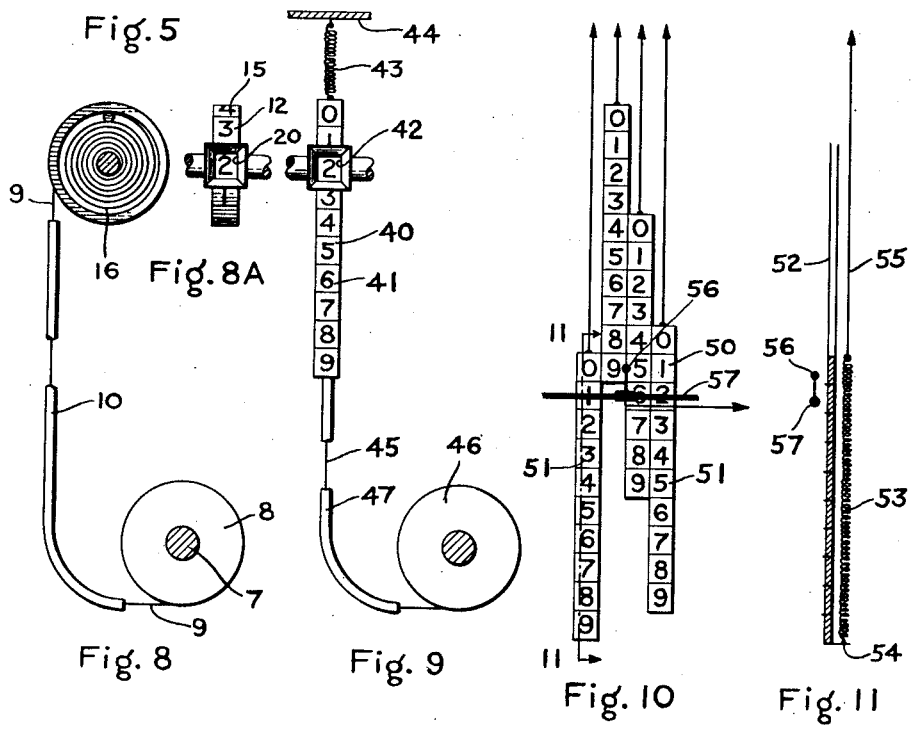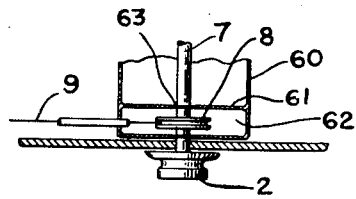

May 20, 1952     A. H. NAEF ET AL     2,597,123
TOTALIZER AND CALCULATOR

Filed July 12, 1946                      3 Sheets-Sheet 3

ALFRED H. NAEF, AND
JOHN P. SMITH, JR.
*INVENTOR.*

BY

Patented May 20, 1952

2,597,123

UNITED STATES PATENT OFFICE 2,597,123

TOTALIZER AND CALCULATOR

Alfred H. Naef and John Preston Smith, Jr., Chatham, N. J., assignors to Daven Company, Newark, N. J., a corporation of New Jersey Application July 12, 1946, Serial No. 683,065

6 Claims. (Cl. 116—129)

This invention relates to a totalizer and calculator for visibly showing the totalized relative positions of a plurality of manually operated rotating knobs or control levers.

In many kinds of electronic, communication, industrial and electrical equipment, such as Wheatstone bridges, and other types of bridges, decade boxes, attenuators, network equipment, complicated switchboards in power plants as well as in some types of mechanical control apparatus, wherein a number of manually operated rotating knobs or control levers are employed it is necessary for the operator to mentally perform the multiplication and additions of the various settings of the knobs or levers to derive the totalized setting of the device. Such process is slow and is conductive to error, particularly in the multiplication of the location of the decimal point in such devices where the knobs are arranged according to the decimal system.

It is an object of the present invention to provide a totalizer and calculator operated by and from the knob or levers which will present the totalized and/or calculated setting of all the knobs or levers at one central spot on the board of the instrument, such spot being convenient to the eye of the operator and thus eliminate the necessity of mental calculation of the settings of the knobs with its liability of error and time consuming calculation.

Another object of the present invention is to provide a totalizer and calculator which will be accurate at all times and will not be subject to inaccuracies in operation by weather conditions or friction of moving parts.

A further object of the invention is to provide a totalizer and calculator which is replaceable as a unit, when replacement or repair is necessary.

With these and other objects in view, as may appear from the accompanying specification, the invention consists of various features of construction and combination of parts, which will be first described in connection with the accompanying drawings, showing a totalizer and calculator of a preferred form embodying the invention, and the features forming the invention will be specifically pointed out in the claims.

In the drawings:

Figure 5 is a side elevation of one of the indicia carrying discs of the totalizer.

Figure 6 is a vertical section taken on the line 6—6 of Figure 5.

Figure 7 is a section taken on the line 7—7 of Figure 5.

Figure 8 is a detail side elevation illustrating the connection between one of the manually operated dials or levers and one of the indicia carrying discs.

Figure 8A is an edge elevation of one of the indicia carrying discs.

Figure 9 is a detail elevation of a modified form of the device illustrating a different type of indicia carrying element.

Figure 10 is a detailed view of a further modification of the indicia carrying elements.

Figure 11 is a vertical section taken on the line 11—11 of Figure 10.

Figure 12 is a detail section showing a manner of hermetically sealing the mechanism.

Figure 1:
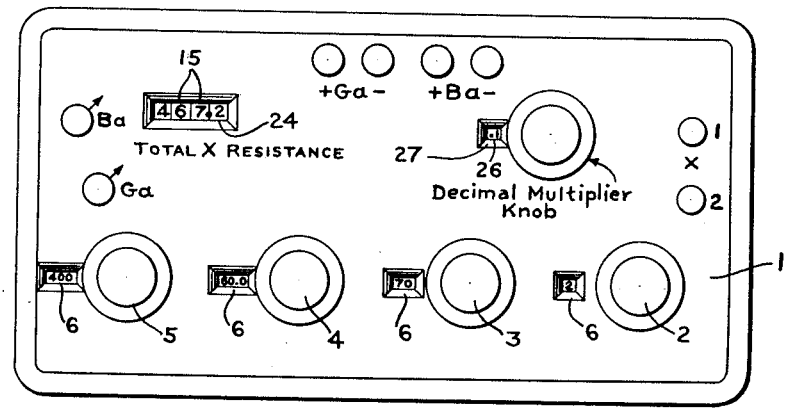
Figure 1 is a front view of the panel board of an electrical setting device showing the totalizer and calculator thereof.
Figures 2, 3:
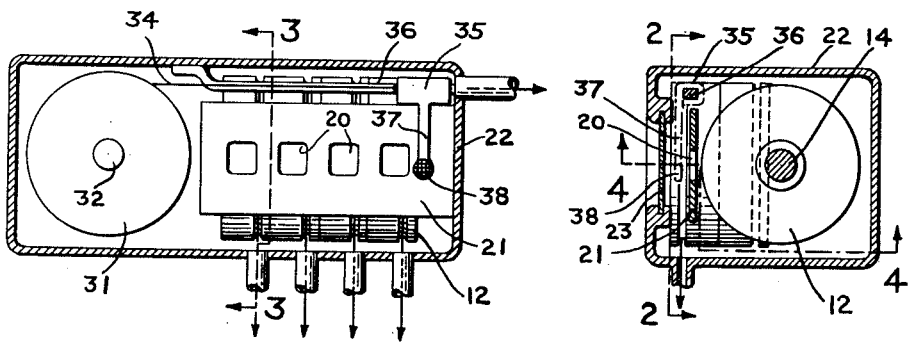
Figure 2 is a vertical section thereof the totalizer and calculator.
Figure 3 is a vertical cross section taken on the line 3—3 of Figure 2.
Figure 4:
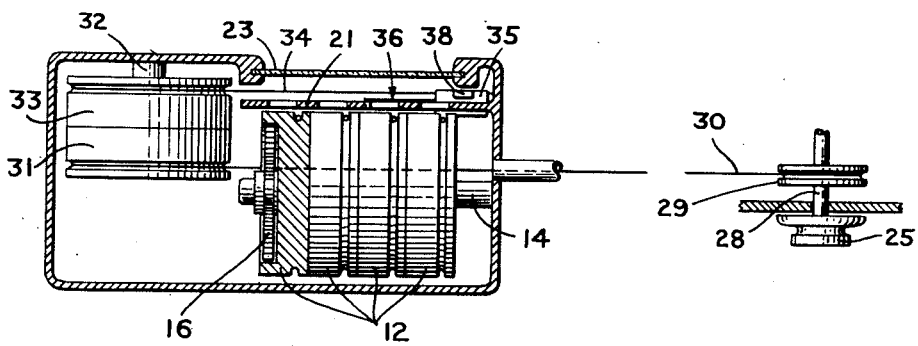
Figure 4 is a horizontal section taken on the line 4—4 of Figure 3.

Referring more particularly to the drawings, the improved totalizer and calculator is shown as associated with a panel board 1 having a plurality of setting knobs 2, 3, 4 and 5 thereof, which may be employed for setting various mechanisms of industrial or electrical equipment such as various types of electrical bridges, including Wheatstone bridges, and decade network equipment, complicated switchboards, etc., as used in such devices, indicia carrying dials (not shown) are associated with the various knobs to indicate the setting of the respective device operated thereby.

As will be noted by particular reference to Figure 12 of the drawings, each of the knobs 2, 3, 4 and 5 has a shaft 7 connected thereto by means of which the knob operates the respective instruments or instrument section (not shown) and a disc 8 is mounted on each of the knob operated shafts 7. The discs 8 are provided with an annular groove in their perimeter and a flexible member 9 is connected to each of the discs 8 and passes through a movable guiding tube 10. The end of the flexible member 9 remote from the end attached to the disc 8 extends partly about the perimeter of the groove 11 forming the indicia carrying disc 12. An indicia carrying disc 12 is provided for each of the knobs 2, 3, 4 and 5 and form in their entirety the totaling indication of the setting of the knobs. The flexible members 9 have their ends inserted to holes drilled into the discs 12 and are rigidly fastened thereto in any manner such as soldering.

The indicia carrying discs 12 are mounted contiguously, that is one against the other on a shaft 14 for independent rotation upon the shaft. The discs 12 have indicia indicated at 15 on their perimeter which corresponds to the indicia exhibited through the window 6.

The indicia carrying discs 12 are urged into zero exhbiting position by coil springs 16 which are coiled in suitable recess 17 and have one end connected to the disc by a suitable pin 18; while the other end is connected to the shaft 14.

Since it is necessary and desirable that the operation of the totaling disc be accurate and unaffected by weather conditions, stretch of the flexible members 9 and also that as long a life as possible be provided for the apparatus, it has been found desirable to make the flexible members 9 of a plurality of twisted metal strands, while the tubes 10 which guide the movement of the strands are made of a metal which has a much higher melting point than the metal of the flexible members as are made. By providing the tubes and the flexible members 9 of metals having different melting points it has been found wear on the flexible members due to friction is greatly reduced; some such metal are Phosphor bronze for the flexible members and steel tubing for the tubes 10.

The indicia 15 on the discs 12 are moved into visible positions through window openings 20 in a guard panel 21. The panel 21 is placed within the housing 22 in which is located the totalizer and calculator discs. The housing 22 has a transparent window 23 therein through which the indicia exhibited through the window openings 20 are visible. The transparent window 23 is positioned behind a suitable opening 24 formed in the panel 1.

A multiplier disc 25 or knob is carried by the panel 1 and it has the usual indicia carrying dial 26 associated therewith the indicia of which are visible through an opening 27 formed in the panel 1 for indicating the setting of the multiplier knob 25.

As is usually in instruments of this kind, the values of the settings of the multiplier knob are in multiples of ten, such as 1,000, 100, 10, .1, .01, and .001.

The multiplier knob 25 has an operated shaft 28 on which is mounted a disc 29 corresponding to the disc 8. A flexible member 30 is connected to the disc 29 and to a disc 31. The disc 31 is mounted on a stub shaft 32 for rotation thereon. A second disc 33 is rotatably mounted on the stub shaft 32 and is connected to the disc 31 for synchronous rotation therewith. A second flexible member 34 is connected to the disc 33 and to a slide 35. The slide 35 is slidably mounted on a suitable guide rod 36 and it carries a pendant arm 37, on the lower end of which is formed the decimal point 38. Thus when the knob 25 is rotated the slide 35 will be moved along its guide 36 to position the point 38 in respect to the indicia 15 exhibited through the window 24 to indicate on the totalized indicated setting of the knobs 2, 3, 4 and 5 and the calculated multiplication of the total as provided by the setting of the multiplier knob 25.

Figure 13:
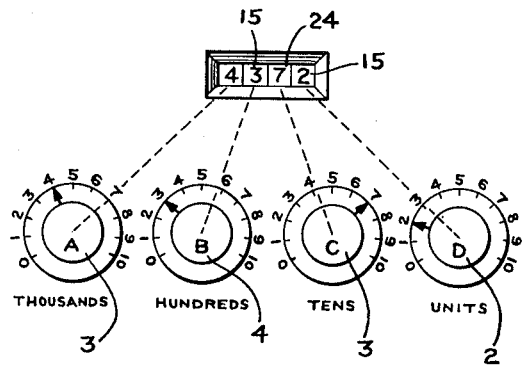
Figure 13 is a diagrammatic view illustrating the manually operating dials and totalizing indicia.
Figure 14:
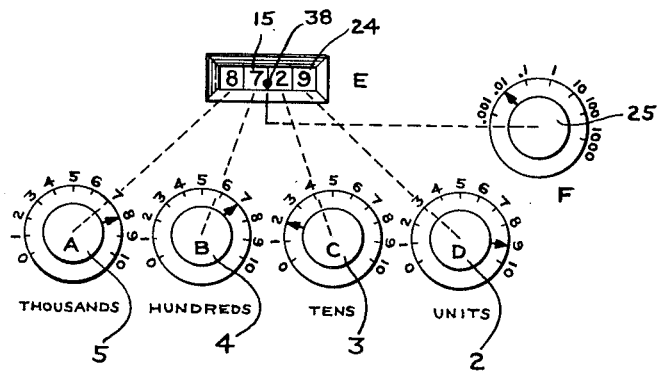
Figure 14 is a diagrammatic view illustrating the manually operating dials or levers, the totalizing indicia and the calculating or multiplying indicia together with its manually operated device.
Figure 15:
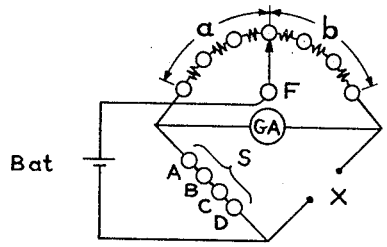
Figure 15 is a diagrammatic view of a Wheatstone bridge showing the application of the calculator thereto.

Relative to the operation of the device, attention is called to Figures 13, 14, and 15. In Figure 13 the various knobs 2, 3, 4 and 5 are set respectively at 2, 7, 3, 4 on the respective dials so that the indicia carrying discs 12 will be operated to exhibit 4, 3, 7, 2 through the window 24 in the panel 1. This illustrates the simple totalized setting of the apparatus. Figures 14 and 15 illustrate the calculated setting of an instrument in connection with a Wheatstone bridge as will be seen from these diagrams, the multiplier or ratio knob translates the decimal point of the indicator in accordance with the value of the ratio of $b/a$. The calculator therefore actually solves the equation $$X=(b/a)(A+B+C+D)$$
$$X=0.1(8\times1000+7\times100+2\times10+9\times1)$$
$$=87.29$$

This equation is predicated on the fact that at the present time most bridge dials in the "S leg" (see Figure 15) have ten positions marked 1 to 10, and in order to obtain the actual value the dial setting must be multiplied by a constant.

In Figure 9 of the drawings, a modified form of the invention is shown and in this form the indicia carrying member of the totalizer is a strip 40 of suitable material which has the indicating indicia 41 thereon. The strip 40 moves behind a window 42 corresponding to the window 20 and it is urged into its uppermost position by the means of a spring 43 which is attached to one end of the strip and to the wall of the housing indicated at 44 which encloses the mechanism. A flexible member 45 corresponding to the flexible member 9 is connected to the strip 43, and is connected to a knob operated disc 46 which corresponds to the disc 8. The flexible member 45 is guided in its movement by a tube 47.

Figures 10 and 11 show a still further modified structure of the device. In these figures the indicia carrying members are in the forms of strips 50 similar to the strips 40, each of which strips 50 carry indicia 41. These strips 50 move or slide in suitable guide 52 and they have springs 53 connected to their lower ends as indicated at 54. Flexible members 55 are connected to the springs 53. The flexible members 55 may be connected to knob operated discs (not shown) similar to the discs 8 and 46 for moving the slides 50. These Figures 10 and 11 also show a decimal point 56 which is slidable along a guide 57 and is operated in the same manner in which decimal 38 is moved.

Figure 12 of the drawings illustrates a manner in which a device may be hermetically sealed in the instrument (not shown) which is operated by each of the knobs 2, 3, 4 and 5 is enclosed in a hermetically sealed casing 60 which has a partition 61 therein forming a compartment 62 in which the disc 8 is located. It is understood that placing of any suitable type indicated at 63 may be used in the partition 61 above the shaft 7 to seal the opening above the shaft.

It will be understood that the invention is not to be limited to the specific construction or arrangement of parts shown, but that they may be widely modified within the invention defined by the claims.

What is claimed is:

1. In a totalizer and calculator, the combination with a plurality of instrument setting elements and a panel board carrying said elements, of a plurality of indicia carrying members having indicia thereon indicative of the position of said elements, said panel having a window therein, said indicia carrying members carried by said panel in contiguous relation to each other and in relation to said window so that one indicia of each member will be visible through said window, flexible members connected one to each of said elements and to the corresponding indicia carrying member to move the indicia carrying member into position to exhibit through said window, said indicia carrying members indicative of the total setting of the elements, a decimal point carrying member, a multiplier element provided with a flexible element for operating said decimal point carrying member to position the decimal in relation to the indicia visible through said window, and springs connected to said indicia carrying members for moving them into zero indicating position.

2. In a totalizer and calculator, the combination with a plurality of instrument setting elements and a panel board carrying said elements, of a plurality of indicia carrying members having indicia thereon indicative of the position of said elements, said panel having a window therein, said indicia carrying members carried by said panel in contiguous relation to each other and in relation to said window so that one indicia of each member will be visible through said window, pulleys carried by each of said elements, pulleys carried by each of said indicia carrying members, flexible member connecting each of said element carried pulleys to the pulley carried by the indicia carrying member corresponding to the element to move the indicia carrying member synchronously with movement of the elements and the association of all the visible indicia will show the total setting of said elements, a decimal point carrying member, a multiplier element, flexible means connecting said multiplier element and said decimal carrying member for moving the decimal point carrying member relative to the indicia visible through said window.

3. In a totalizer and calculator including, a panel board, a plurality of instrument setting elements on said panel board, a plurality of indicia carrying members having indicia thereon indicative of the position of said elements, said panel having a window therein, said indicia carrying members carried by said panel in contiguous relation to each other and in relation to said window so that one indicia of each member will be visible through said window, said indicia remote from said instrument setting element on said panel, pulleys on each of said elements, and pulleys carried by each of said indicia carrying members the combination with said pulleys of means associated with each of said pulleys of said elements and to the corresponding pulleys of said indicia carrying members to move the indicia carrying member into position to indicate the total of the elements including, flexible members, metal guiding tubes for guiding movement of said flexible members, said flexible members composed of a plurality of metal strands twisted together and being of a metal having a melting point of different degree than the melting point of said guiding tubes.

4. In a totalizer and calculator as claimed in claim 3 wherein the metal strands forming any one flexible member are of Phosphor bronze having a melting point of different degree than the melting point of its respective guiding tube.

5. In an automatic totaling indicator, a panel board, a plurality of instrument setting elements on said panel board, operating shafts fixedly connected to each of said instrument setting elements, indicia circumferentially spaced on each of said instrument setting elements, individual viewing windows for each of said instrument setting elements to expose one of said circumferentially spaced indicia on each respective instrument setting to show the respective settings of each of said instrument setting elements, a master window in said panel, a plurality of indicia carrying members having indicia thereon identical with the circumferentially spaced indicia on each of said instrument setting elements, said indicia carrying members carried by said panel board remote from said elements in contiguous relation to each other and in relation to said window so that one indicia of each member will be visible through said master window, means connecting each of said elements to its respective indicia carrying member for simultaneous movement to move the indicia carrying members into position to indicate the total setting of the elements, a decimal point carrying member visible through said window and between the window and said indicia carying members, a multiplier element carried by said panel remote from said decimal point carrying member, and flexible means connecting said multiplier element and said decimal point carrying member to position the decimal point in relation to the indicia visible through said master window whereby the total setting of the instruments are visible at a glance.

6. In an automatic totaling indicator as claimed in claim 5 wherein the means for connecting the instrument setting elements and the indicia carrying members comprises, pulleys fixedly connected to each of said operating shafts and rotatable with said instrument setting elements, a groove forming a pulley on each of said indicia carrying members, flexible members connecting each of said operating shaft pulleys to its respective groove on each of the indicia carrying members corresponding to the element to move the indicia carrying member synchronously with the movement of the elements the association of all of the visible indicia to show the total setting of said elements, steel guiding tubes for guiding movement of said flexible members, and said flexible members composed of a plurality of metal strands twisted together and being of a metal having a melting point of different degree than the melting point of the guiding tubes.

ALFRED H. NAEF.
JOHN PRESTON SMITH, Jr.

REFERENCES CITED

The following references are of record in the file of this patent:

UNITED STATES PATENTS

| Number | Name | Date |
|---|---|---|
| 835,844 | Bewan | Nov. 13, 1906 |
| 1,467,853 | Heinold | Sept. 11, 1923 |
| 1,522,986 | Taylor | Jan. 13, 1925 |
| 1,865,553 | Berger | July 5, 1932 |
| 2,329,180 | Boyd | Sept. 14, 1943 |
| 2,374,298 | Nasset | Apr. 24, 1945 |

FOREIGN PATENTS

| Number | Country | Date |
|---|---|---|
| 432,021 | Great Britain | July 15, 1935 |

OTHER REFERENCES

"Daven Notes" for March 1946.